United States Patent [19]

Hellmann

[11] 4,376,254

[45] Mar. 8, 1983

[54] ANNULAR MOLDED ARTICLE SECURED TO A SHAFT

[75] Inventor: John V. Hellmann, Anderson, Ind.

[73] Assignee: General Motors Corporation, Detroit, Mich.

[21] Appl. No.: 272,252

[22] Filed: Jun. 10, 1981

[51] Int. Cl.[3] .................... H02K 13/04

[52] U.S. Cl. .................... 310/235; 310/219; 310/236; 403/365

[58] Field of Search .................... 310/232-236, 310/237, 219, 231, 238; 403/365, 372, 283, 280; 308/237 R, 71, DIG. 5; 29/597, 598

[56] References Cited

U.S. PATENT DOCUMENTS

| | | | |
|---|---|---|---|
| 435,504 | 9/1890 | Lieb | 310/236 |
| 1,839,094 | 12/1931 | Geyer | 308/237 R |
| 2,161,559 | 6/1939 | Cooke | 308/237 R |
| 2,606,220 | 8/1952 | Labastie | 310/236 |
| 2,645,732 | 7/1953 | Marsal | 310/234 |
| 3,104,136 | 9/1963 | Merriam | 308/237 R |

FOREIGN PATENT DOCUMENTS

| | | | |
|---|---|---|---|
| 624354 | 10/1962 | Belgium | 403/372 |
| 1204032 | 1/1960 | France | 310/236 |
| 572623 | 1/1958 | Italy | 310/236 |
| 67953 | 9/1941 | Norway | 310/236 |
| 678274 | 9/1952 | United Kingdom | 310/236 |
| 838278 | 6/1960 | United Kingdom | 310/233 |

*Primary Examiner*—R. Skudy
*Attorney, Agent, or Firm*—Mark A. Navarre

[57] ABSTRACT

A stamped and rolled sheet metal bushing having pointed barbs on its exterior periphery and longitudinal ribs on its interior periphery is inserted into the bore of a premolded commutator assembly. An armature shaft is press fit into the bushing assembly, deforming the longitudinal ribs to couple the shaft to the bushing and embedding the pointed barbs into the molded material of the commutator to couple the bushing to the commutator.

3 Claims, 5 Drawing Figures

ANNULAR MOLDED ARTICLE SECURED TO A SHAFT

This invention relates to a method and apparatus for securely fastening an annular molded article such as a commutator or other current collector to a shaft such as the armature shaft of an electric motor.

In the assembly of a DC electric motor, the commutator must be secured to the armature shaft for rotation therewith. When the commutator conductors are supported on a molded resin core, attachment of the commutator to the shaft requires the use of a bushing that engages both the commutator molded material and the shaft. Conventionally, a thick die-cast metal bushing is placed in the bore of the commutator during the molding process by a technique known as insert molding. The outer periphery of the bushing has splines or finger-like projections which are surrounded by the molded material so that after the resin is completely cured, the bushing is immobilized relative to the commutator core. The inner periphery of the bushing has a rigid surface so that when the armature shaft is press fit into the bushing, the bushing ridges are deformed to secure the commutator core to the armature shaft.

A disadvantage of the above-described method is that insert molding is a relatively expensive and time consuming process. Furthermore, the bushing is typically an expensive part such as die-cast zinc.

Accordingly, it is an object of this invention to provide an improved method for securely fastening a molded article such as a commutator to a shaft with a bushing wherein the assembly steps are simplified and wherein the bushing is inexpensive to manufacture.

It is a further object of this invention to provide an improved method of fastening a molded commutator to an electric motor armature shaft with a bushing wherein the outer periphery of the bushing has a plurality of pointed projections formed thereon which are embedded in the molded material of the commutator when the armature shaft is press fit into the bushing.

It is a further object of this invention to provide a commutator and armature shaft nonrotatably coupled by a rolled sheet metal bushing wherein the bushing incorporates a plurality of pointed barbs on its outer periphery for engaging the molded material of the commutator and a plurality of deformable ribs on its inner periphery for engaging the armature shaft and a split along its longitudinal axis.

These objects are carried forward by stamping a bushing from flat sheet metal stock, by deforming the metal to form barbs on one side of the bushing and ribs on the other, and by rolling the bushing into a cylindrical shape, leaving a small space or slit between the bushing ends. After the molded material of the commutator has completely cured, the bushing is inserted into the commutator bore. The armature shaft is then press fit into the bushing so that the bushing ribs deform to absorb shaft and bore diameter tolerances while applying localized pressure on the shaft, and so the barbs penetrate the molded material.

The method of this invention thus eliminates the insert molding process and uses a bushing that is inexpensive to manufacture. The process is especially useful when the molded material is easily fractured.

IN THE DRAWINGS

In each of the above drawings, the same reference numerals have been assigned to corresponding elements.

Figure 1:
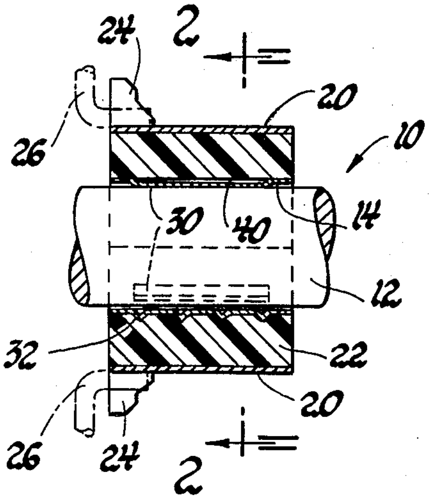
FIGS. 1 and 2 are cross-sectional views of a molded commutator, bushing and armature shaft assembled according to the teachings of this invention.
Figure 2:
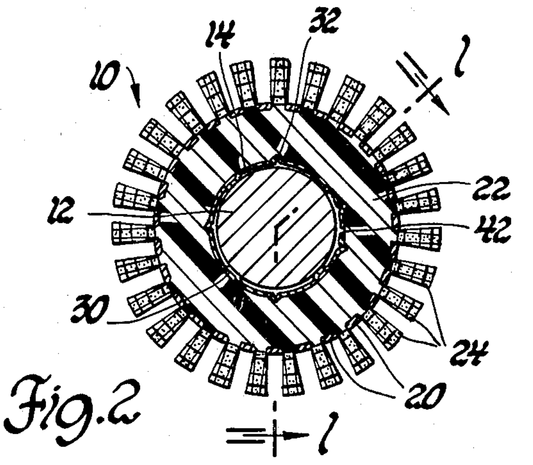

Referring now more particularly to FIGS. 1 and 2, reference numeral 10 generally designates a DC electric motor commutator secured to a motor armature shaft 12 by a bushing 14. Commutator 10 comprises a plurality of conductor bars 20 disposed about and supported by a hub or core 22 of molded insulating material having a circular bore 40 extending therethrough. According to common practice, the molded material of core 22 is a thermosetting phenol-resin such as Bakelite, and the conductor bars 20 are secured to the material with a dove-tail or similar joint (not shown). Conductor bars 20 each have a riser 24 at one end for connecting the bars 20 to armature windings 26, and bars 20 cooperate with a brush assembly (not shown) in a conventional manner to energize windings 26 from an external source of direct current.

Figure 3:
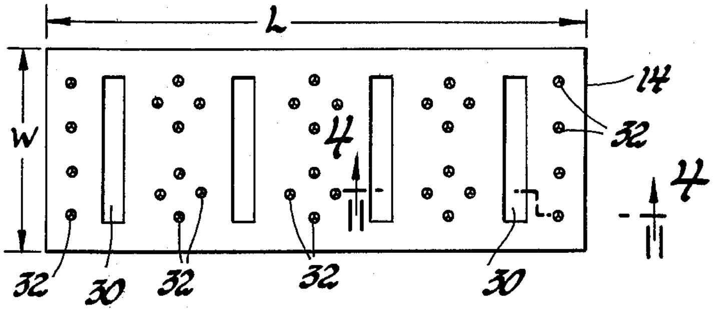
FIGS. 3 and 4 are elevation and cross-sectional views of the flat sheet metal bushing prior to the rolling operation.
Figure 4:
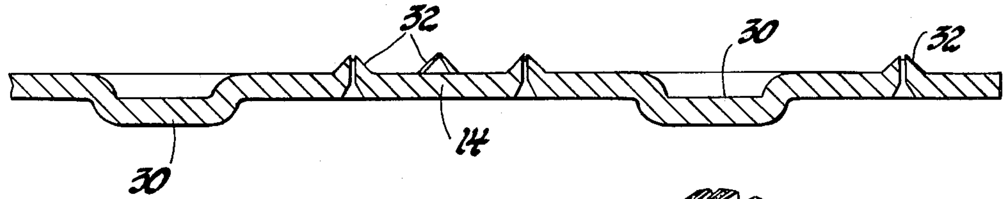
Figure 5:
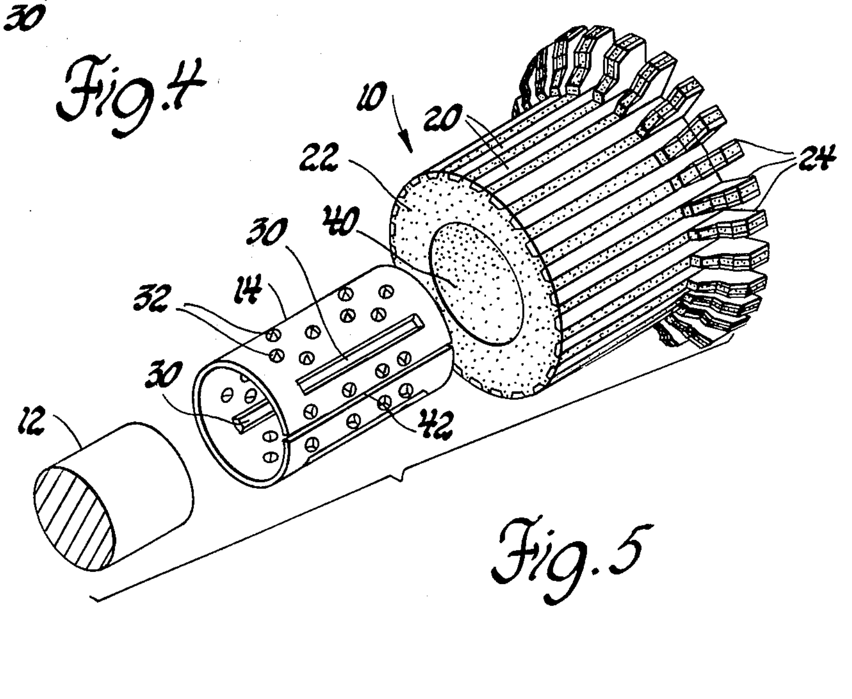
FIG. 5 is an exploded perspective view of the molded commutator, the bushing, and the armature shaft.

As may be seen more clearly with reference to FIGS. 3–4, bushing 14 is stamped out of flat sheet metal stock. The width W of bushing 14 corresponds to the axial length of commutator bore 40. The length L of bushing 14 is slightly less than the circumference of commutator bore 40 so that the rolled bushing (as shown in FIG. 5) will fit into bore 40 without overlapping of the bushing ends. Using conventional metal working machines, a plurality of parallel ribs 30 are formed on one side of the bushing stamping along dimension W and a plurality of pointed barbs 32 are formed on the other side of the stamping. Preferably, the indentations that form barbs 32 are sufficiently deep to fracture the sheet metal of bushing 14 to provide sharp metal points on barbs 32.

Bushing 14 is then rolled into a cylindrical shape as shown in FIG. 5 so that the pointed barbs 32 are on the outer periphery of the bushing and the ribs 30 are on the inner periphery of the bushing. When the bushing is rolled, a small space or slit 42 is retained between the bushing ends as indicated above so that when the armature shaft 12 is press-fit into bushing 14, the diameter of bushing 14 will adjust itself to the inside diameter 40 of commutator 10.

The method of securing the commutator to the armature shaft will now be described. After the curing of the commutator molded material 22 is completed, rolled bushing 14 is inserted into the commutator bore 40. Since the bushing fits snugly within bore 40, pointed barbs 32 scratch the glazed surface of the molded material as bushing 14 is inserted, aiding in the eventual penetration of barbs 32 into molded material 22. Armature shaft 12 is then press fit into bushing 14, deforming longitudinal ribs 30 as it is inserted. The deformation of ribs 30 provides a localized force between shaft 12 and bushing 14 and also serves to absorb diameter tolerances of shaft 12 and bore 40. As shaft 12 is inserted into bushing 14, the pointed tips of barbs 32 penetrate into and become firmly embedded in the molded material 22, providing a rigid nonrotatable connection between bushing 14 and commutator 10.

The method and apparatus of this invention thus permits the attachment of a molded article such as a commutator to a shaft such as the armature shaft of an electric motor with a simply manufactured and inexpensive sheet metal bushing. Furthermore, the insert molding process has been eliminated, simplifying the assembly. Shaft diameter tolerances which were heretofore absorbed by deforming a relatively thick die cast bushing are absorbed according to the present invention by longitudinal splines 30 and by split 42 which extends along the length of bushing 14.

Although this invention has been primarily described with respect to the attachment of a molded commutator to an electric motor armature shaft, it will be appreciated that further applications, such as the attachment of a slip ring assembly to an armature shaft, are also within the scope of this invention. Various other modifications of the disclosed embodiment may occur to those skilled in the art and such modifications may also be within the scope of this invention which is limited only by the appended claims.

The embodiments of the invention in which an exclusive property or privilege is claimed are defined as follows:

1. An electric motor armature comprising: a current collector having metallic conductor means supported on a hub of insulating molded material with a circular bore extending therethrough, a rolled sheet metal bushing disposed within said circular bore, said bushing having a plurality of pointed barbs extending from the outer periphery thereof and a plurality of ribs extending from the inner periphery thereof, and an armature shaft press-fitted into said bushing, the relative diameters of said bore, bushing and shaft being such that the insertion of said shaft into said bushing operates to deform said ribs to thereby nonrotatably secure said bushing to said shaft and to embed said pointed barbs into the molded material of said hub to thereby nonrotatably secure said bushing to said molded material whereby said current collector is nonrotatably secured to said shaft.

2. An electric motor armature comprising: a commutator having a molded core of insulating material and a plurality of conductor bars supported thereon, the core having a circular bore extending therethrough, a rolled sheet metal bushing disposed within said circular bore, said bushing having a plurality of pointed barbs extending from the outer periphery thereof and a plurality of ribs extending from the inner periphery thereof, and an armature shaft press-fitted into said bushing, the relative diameters of said bore, bushing and shaft being such that the insertion of said shaft into said bushing operates to deform said ribs to thereby nonrotatably secure said bushing to said shaft and to embed said pointed barbs into the molded material of said core to thereby nonrotatably secure said bushing to said commutator so that said commutator is nonrotatably secured to said shaft, said bushing having a split along its longitudinal periphery for permitting the outside diameter of said bushing to conform to the diameter of the commutator bore.

3. An electric motor armature shaft and commutator assembly comprising: a commutator having a molded core of insulating material with a circular bore extending therethrough, a rolled sheet metal bushing disposed within said circular bore, said bushing having a plurality of regularly spaced pointed barbs extending from the outer periphery thereof and a plurality of regularly spaced ribs extending from the inner periphery thereof, and an armature shaft press-fitted into said bushing, the relative diameters of said bore, bushing and shaft being such that the insertion of said shaft into said bushing operates to deform said ribs to thereby nonrotatably secure said bushing to said shaft and to embed said pointed barbs into the molded material of said core to thereby nonrotatably secure said bushing to said commutator so that said commutator is nonrotatably secured to said shaft, said ribs and pointed barbs being alternately spaced around the circumference of said rolled bushing whereby the interaction between said bushing and said shaft and between said bushing and said commutator core is substantially uniform to provide positive securement of said shaft to said commutator assembly.

* * * * *